United States Patent [19]

Buchanan

[11] Patent Number: 4,909,551
[45] Date of Patent: Mar. 20, 1990

[54] LATCH ASSEMBLY FOR AN ELECTRICAL LOAD CENTER DOOR, AND METHOD OF ASSEMBLY THEREOF

[75] Inventor: Jeffery J. Buchanan, Lexington, Ky.

[73] Assignee: Square D Company, Palatine, Ill.

[21] Appl. No.: 382,874

[22] Filed: Jul. 19, 1989

[51] Int. Cl.⁴ .............................................. E05C 1/10
[52] U.S. Cl. ........................... 292/175; 292/DIG. 38; 292/DIG. 61
[58] Field of Search ............... 292/163, 169, 175, 177, 292/DIG. 38, DIG. 61, 170, 173, 165

[56] References Cited

U.S. PATENT DOCUMENTS

| | | | |
|---|---|---|---|
| 3,724,889 | 4/1973 | Dooley | 292/175 X |
| 3,825,289 | 7/1974 | Armstrong | 292/DIG. 38 X |
| 3,841,674 | 10/1974 | Bisbing et al. | 292/175 |
| 4,061,369 | 12/1977 | Palmer et al. | 292/DIG. 38 X |
| 4,790,579 | 12/1988 | Maxwell et al. | 292/DIG. 175 |

*Primary Examiner*—Richard E. Moore
*Attorney, Agent, or Firm*—Jose W. Jimenez

[57] ABSTRACT

An electrical distribution load center consists of a non-conductive enclosure and a circuit breaker bus bar support panel that are interconnected by interlock members that can be snap-fitted to secure the two panels to each other. The support panel also has a latch member so that the bus bars can be mounted onto the panel in a heat-staking, insert-molded or snap-fit arrangement. The support panel also has elements for locking the circuit breakers onto the panels in conducting contact with the bus bars. The enclosure and the support panel are enclosed by a non-metallic trim panel that has a non-metallic door hinged thereto and which carries a latch for latching the door to the trim panel.

6 Claims, 13 Drawing Sheets

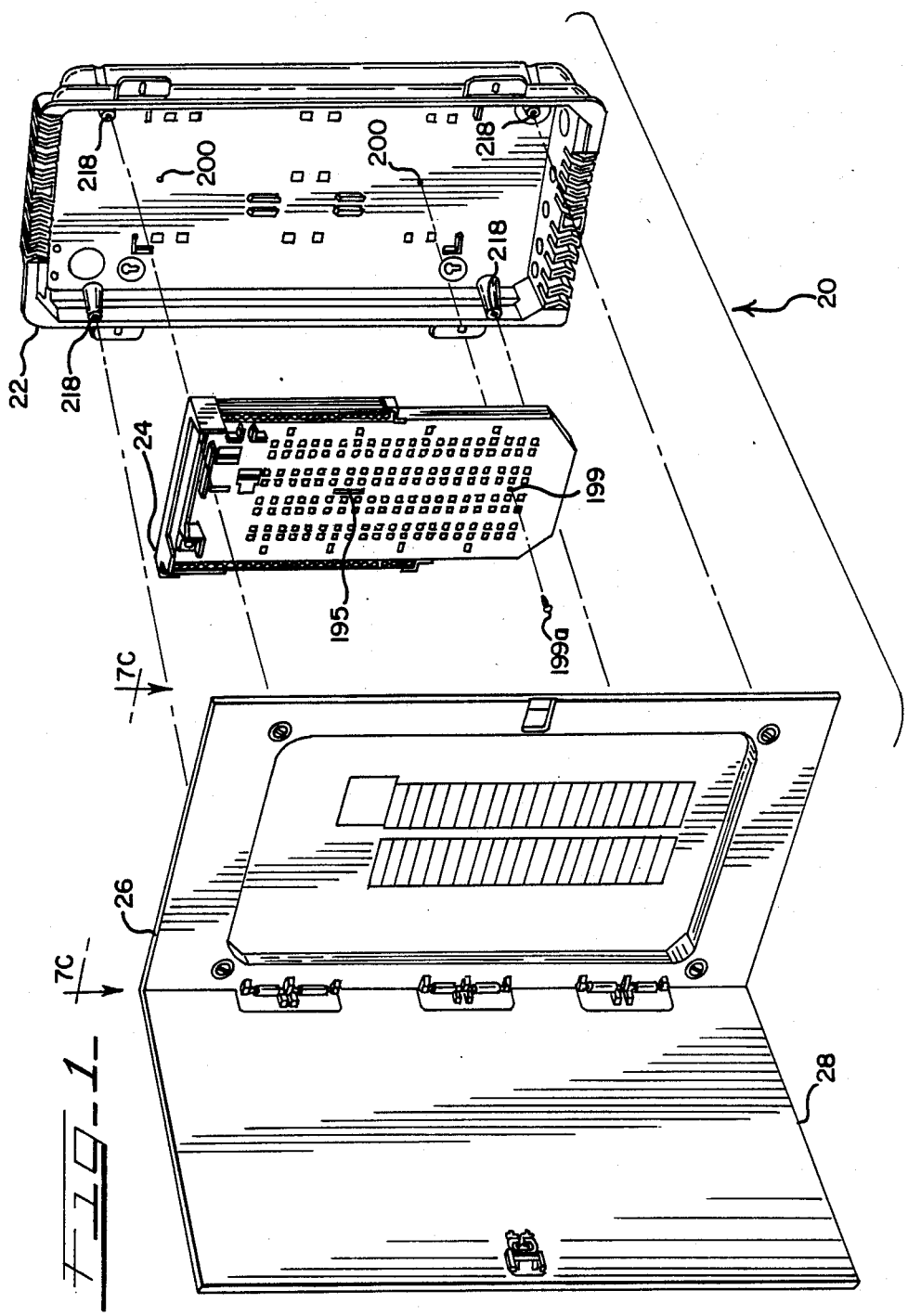

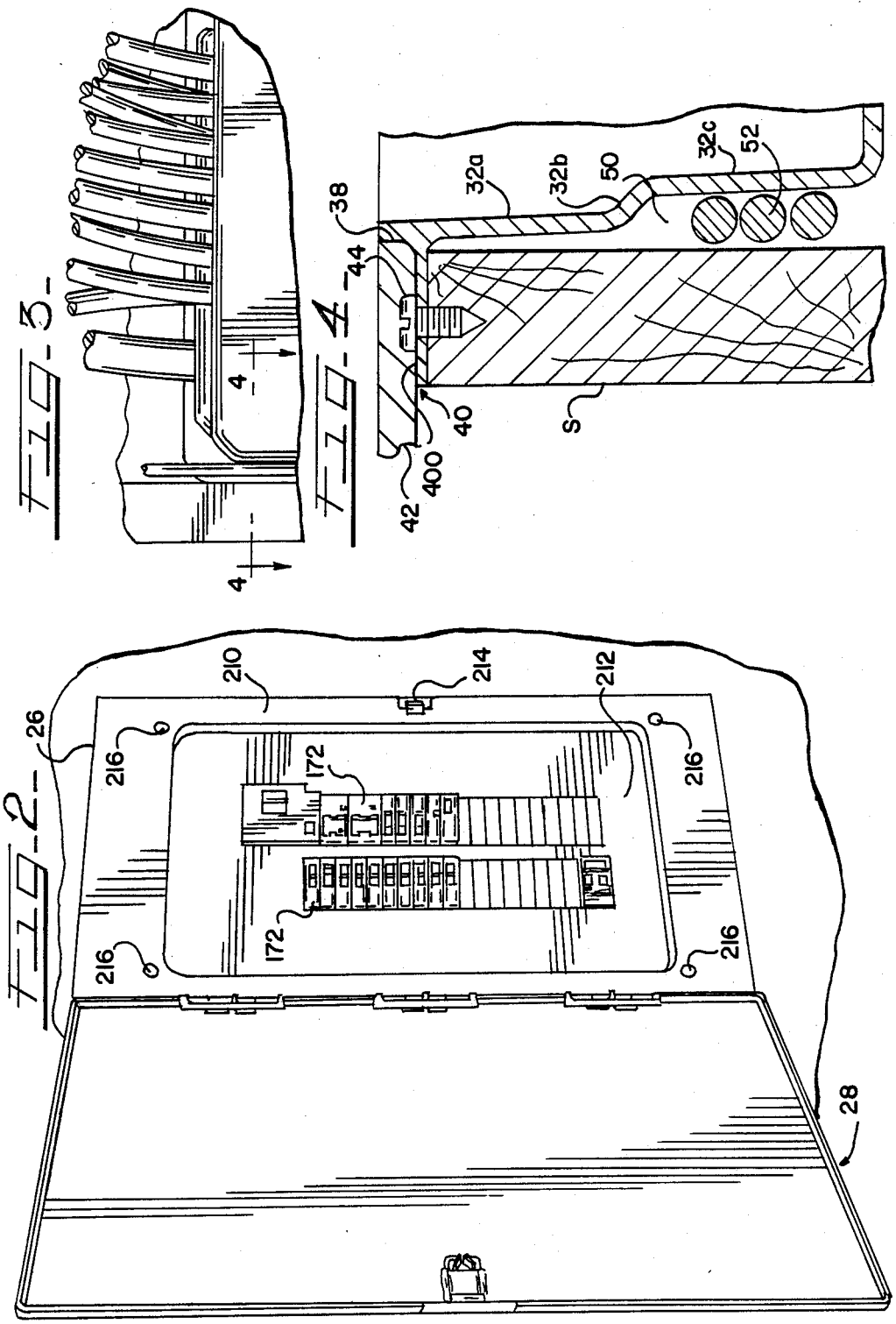

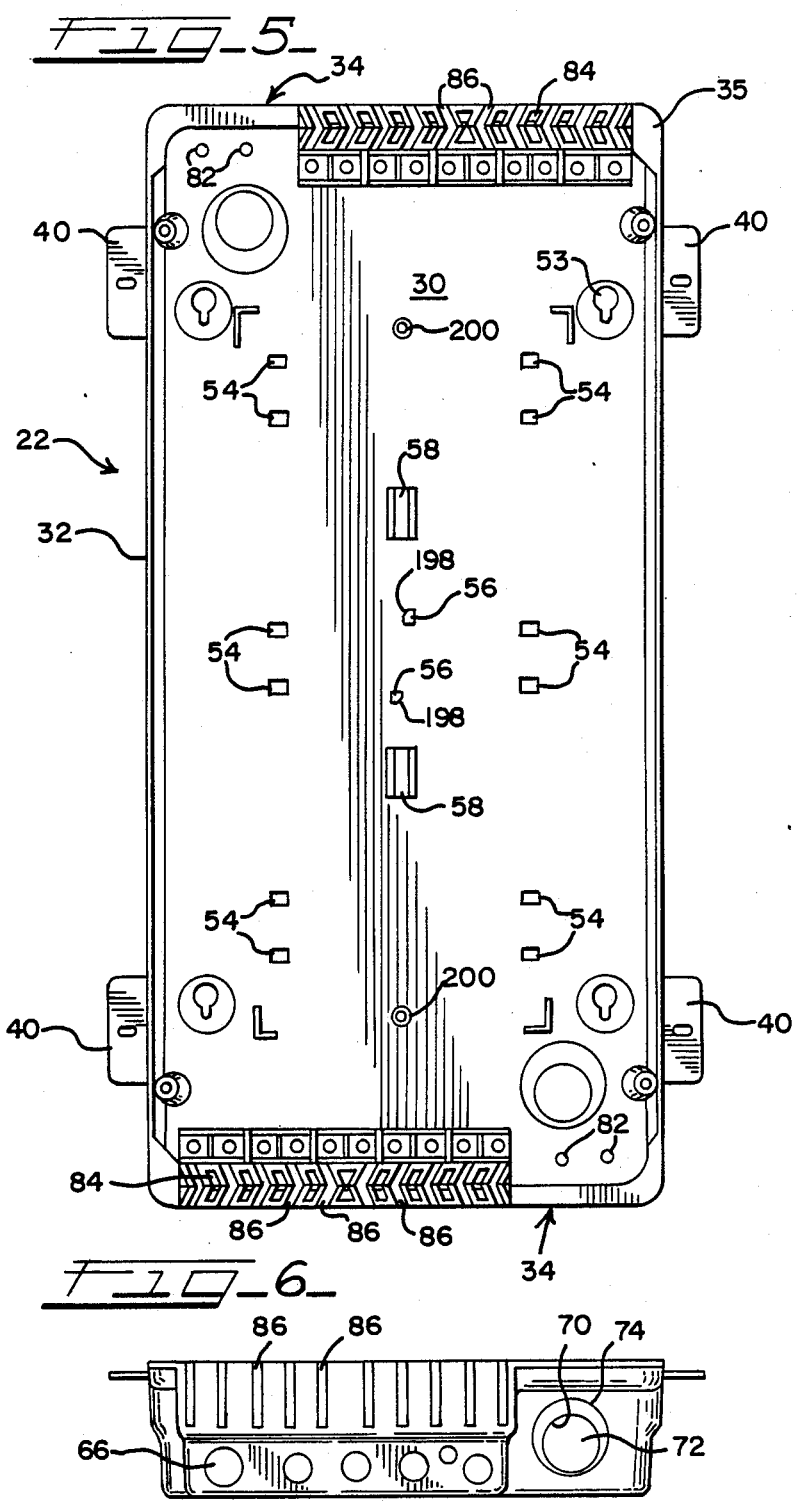

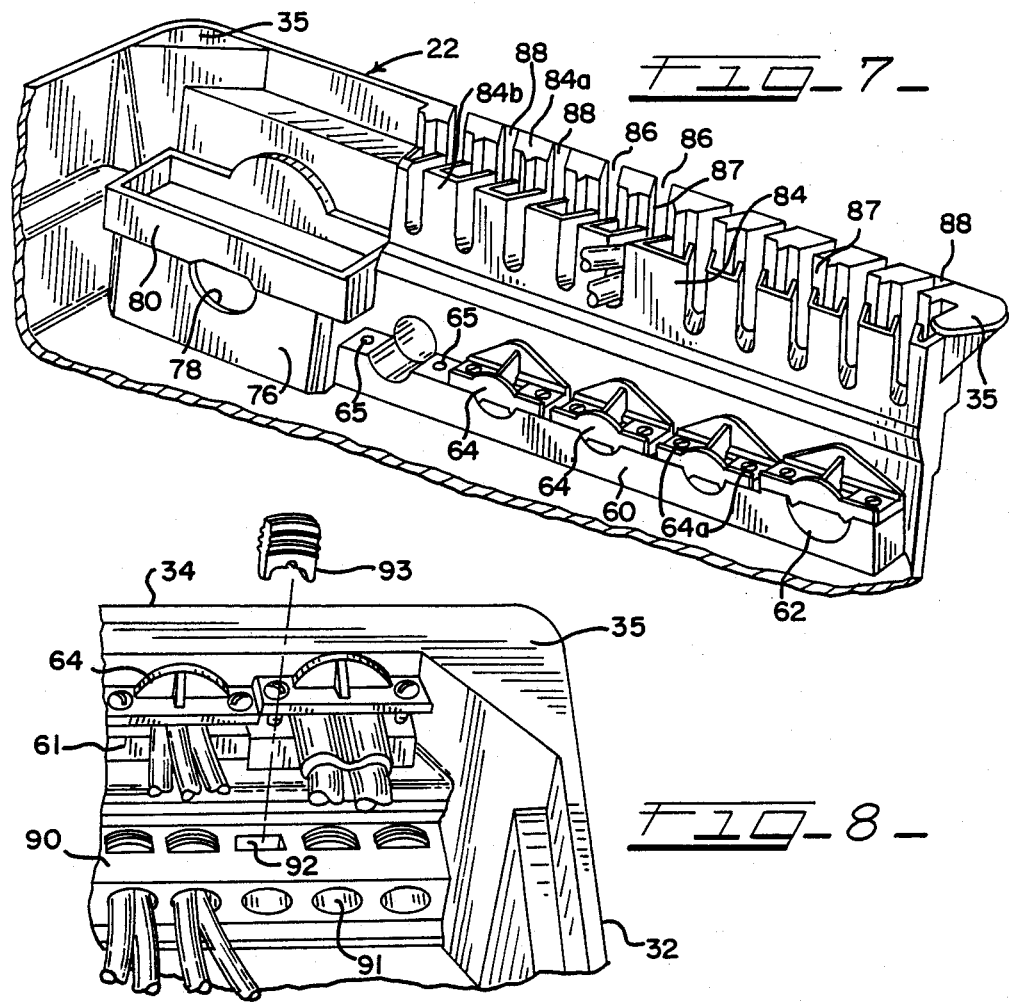
FIG_7_
FIG_8_
FIG_9_
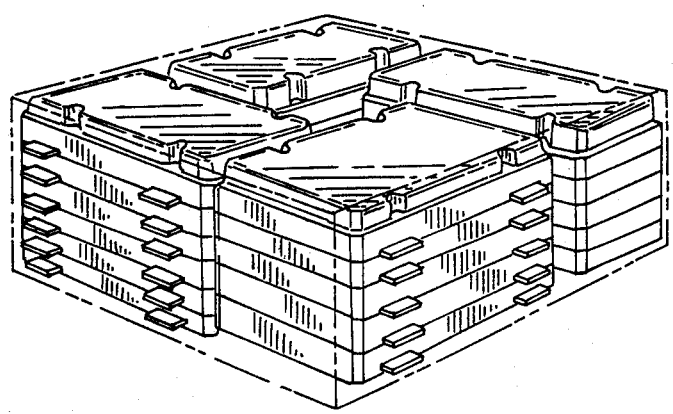

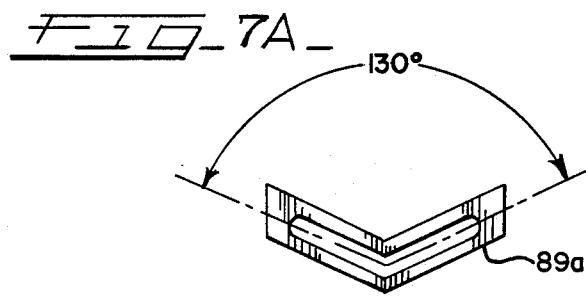
FIG_7A_
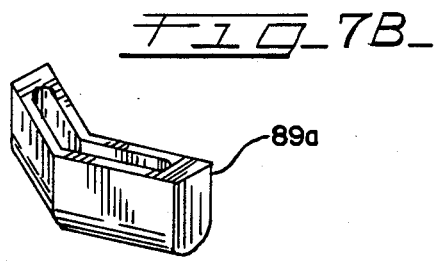
FIG_7B_
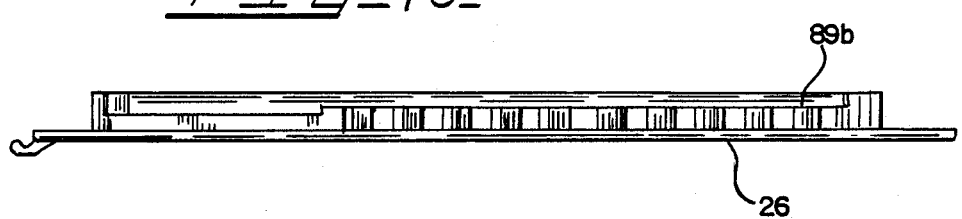
FIG_7C_

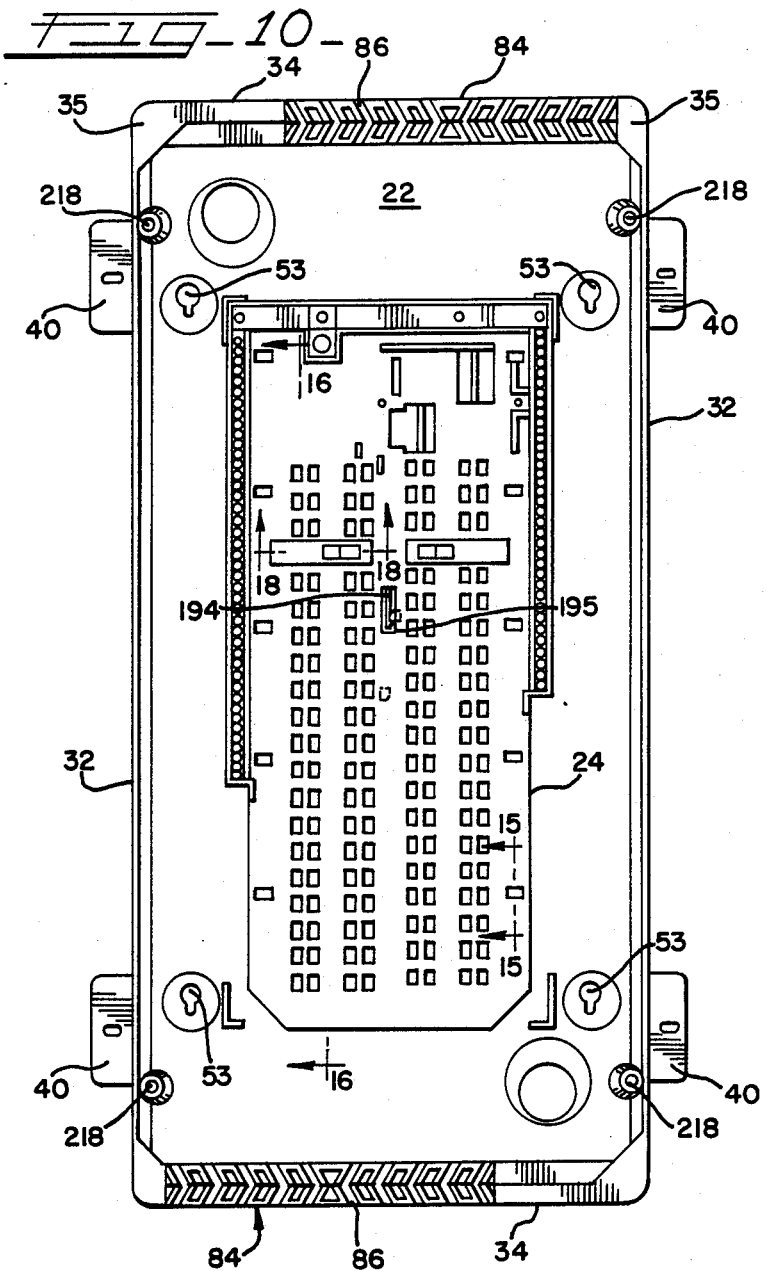

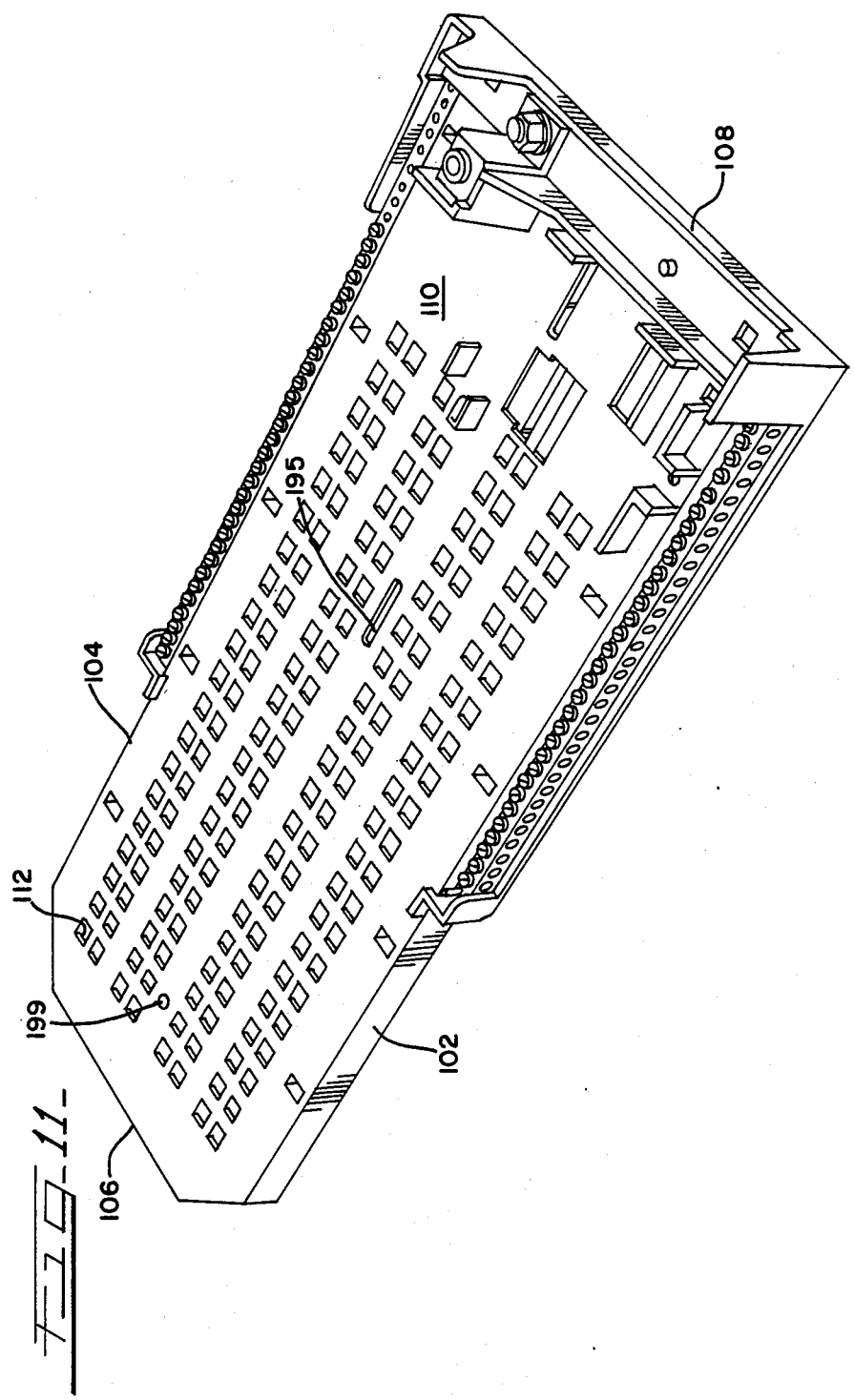

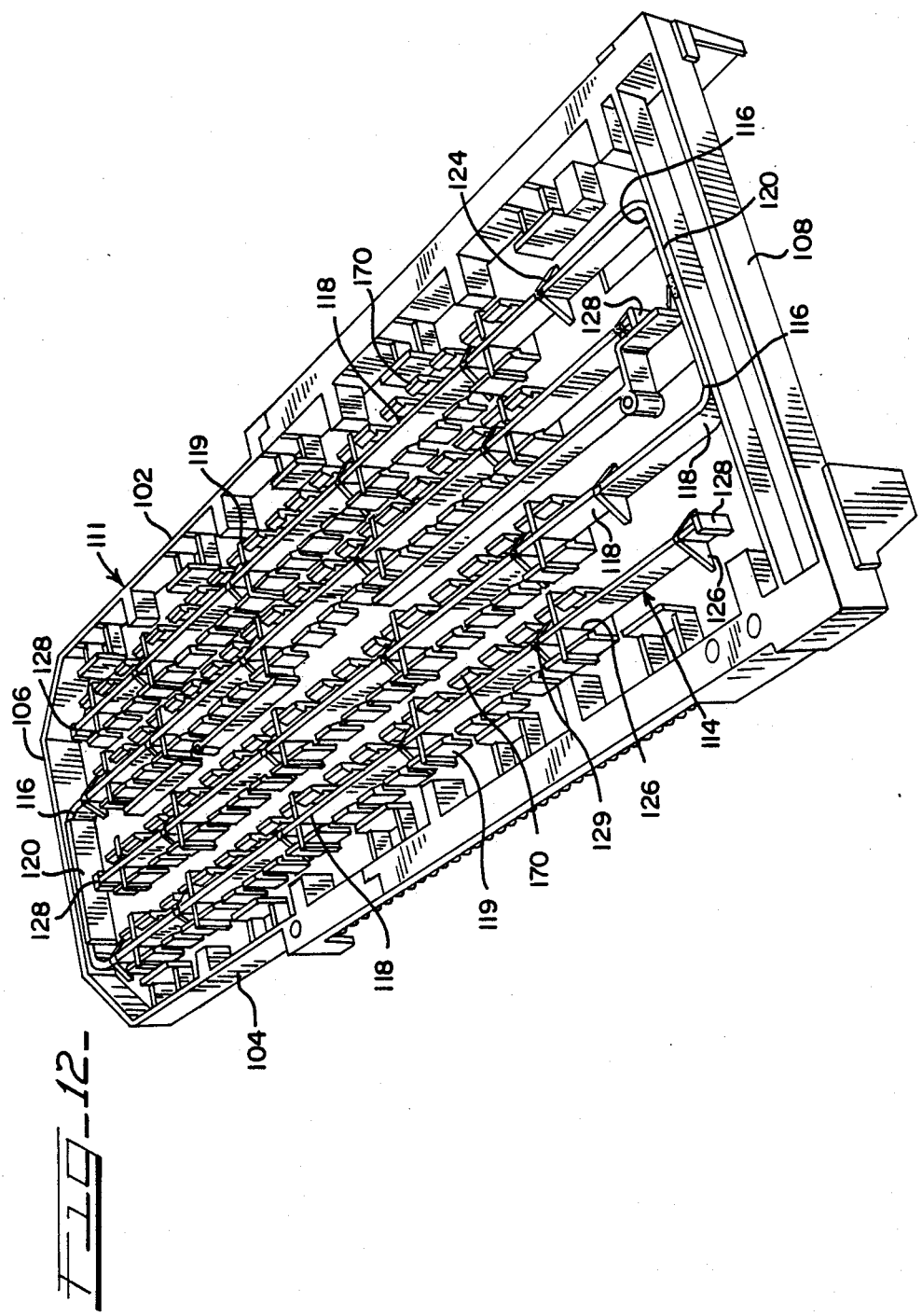

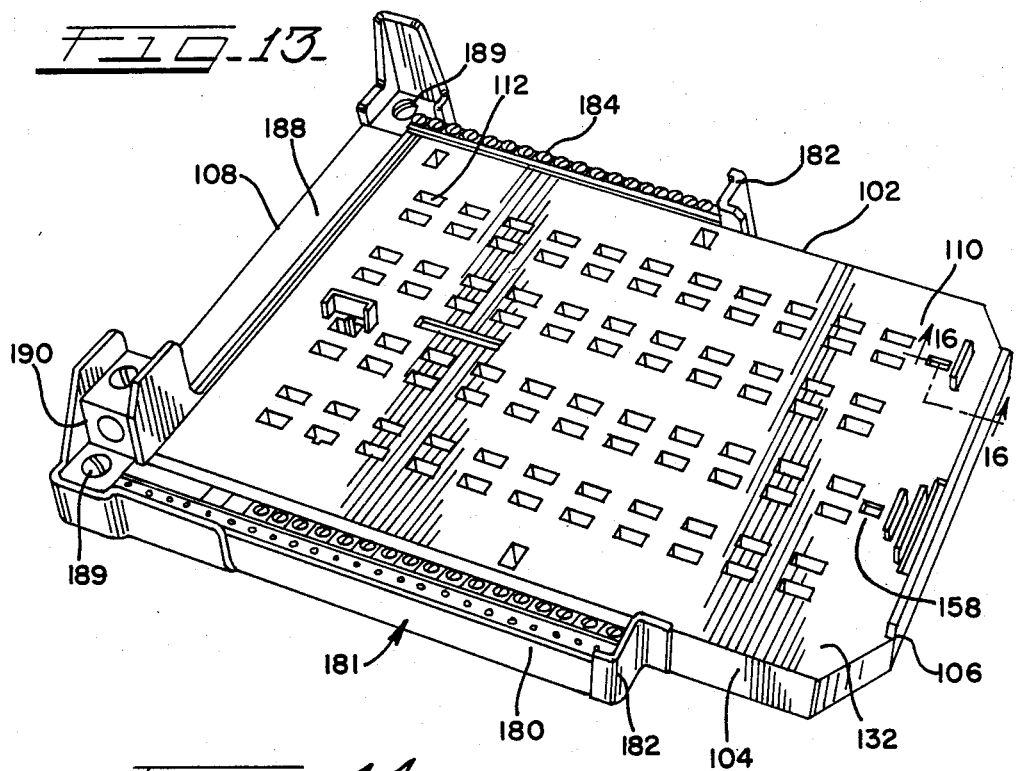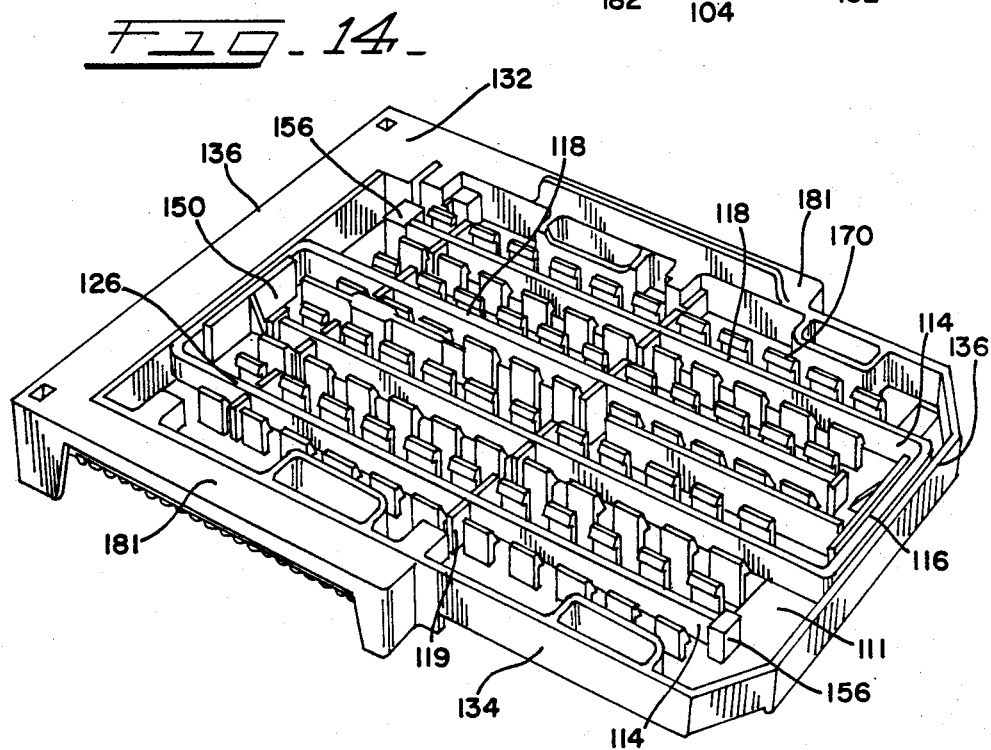

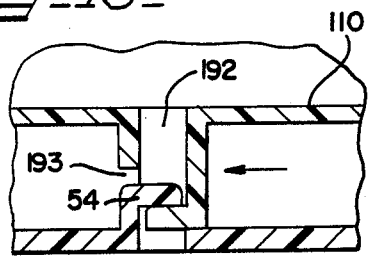
FIG-15-
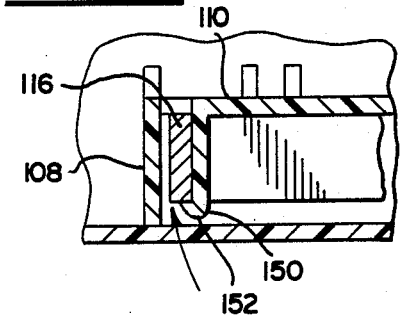
FIG-16a-
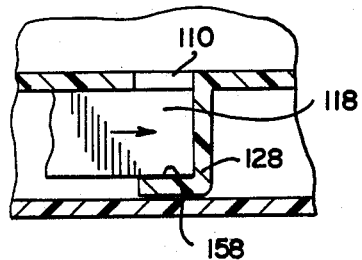
FIG-16b-
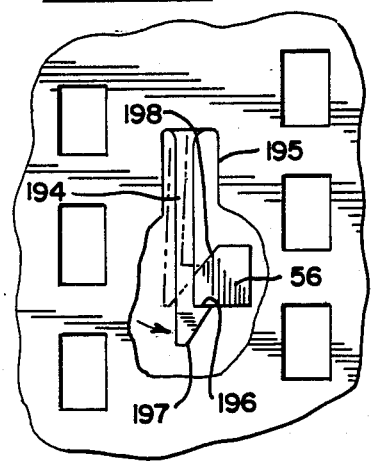
FIG-17-
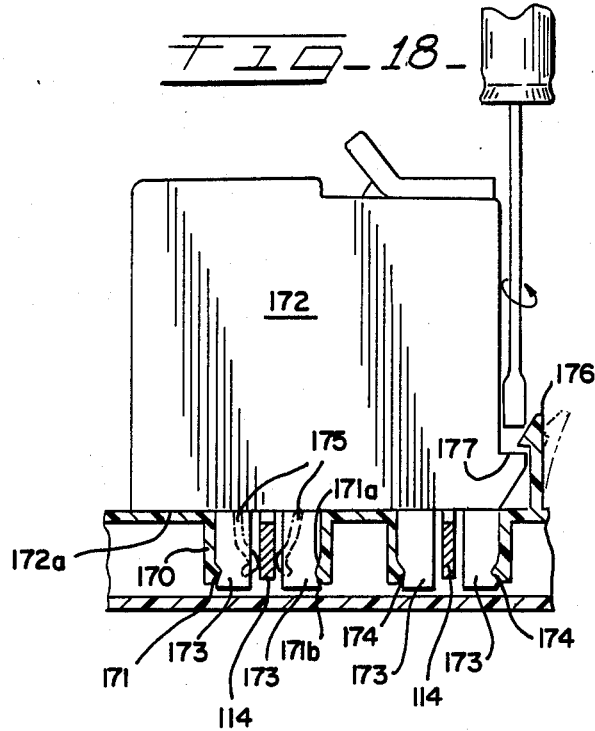
FIG-18-

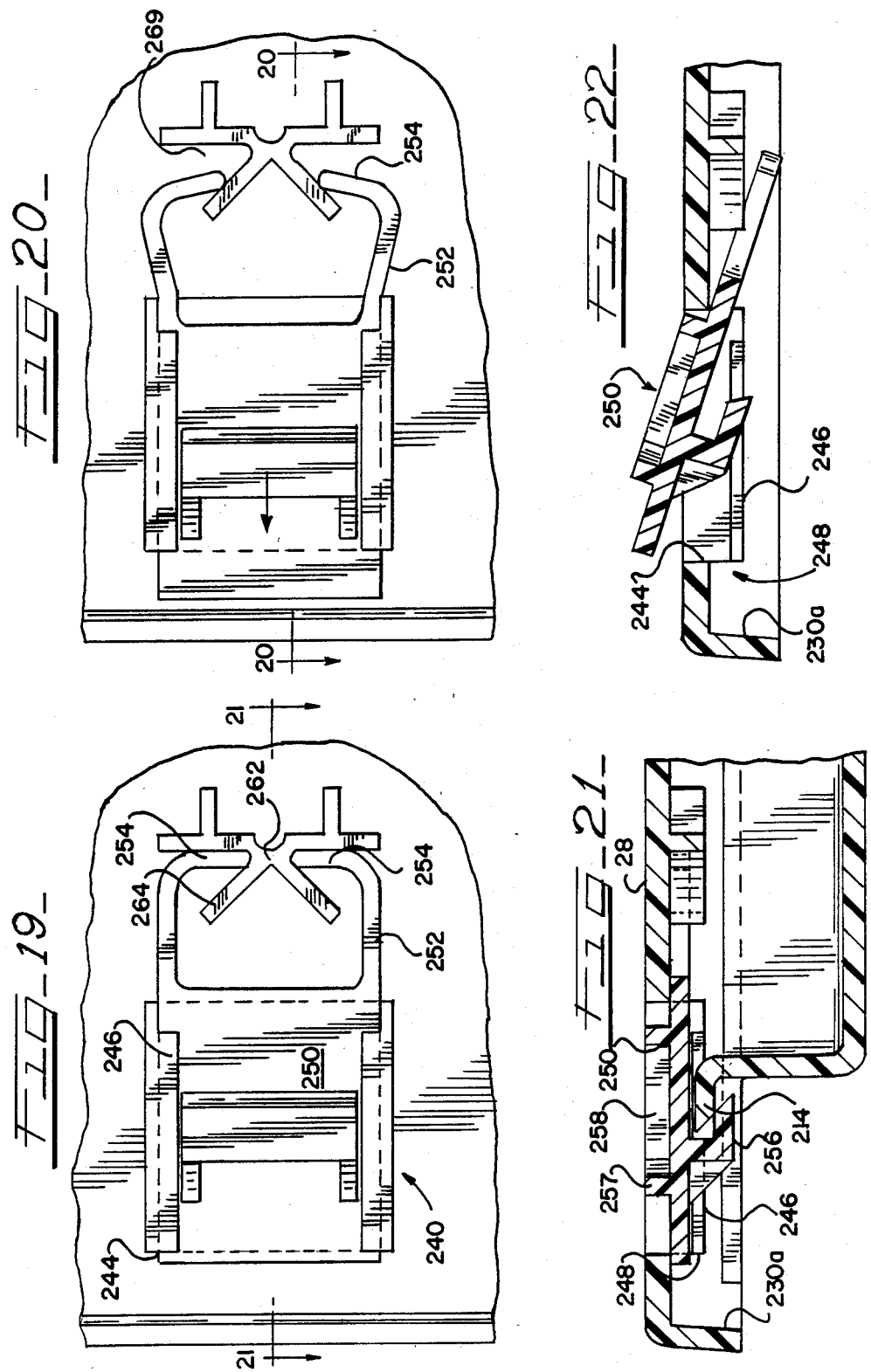

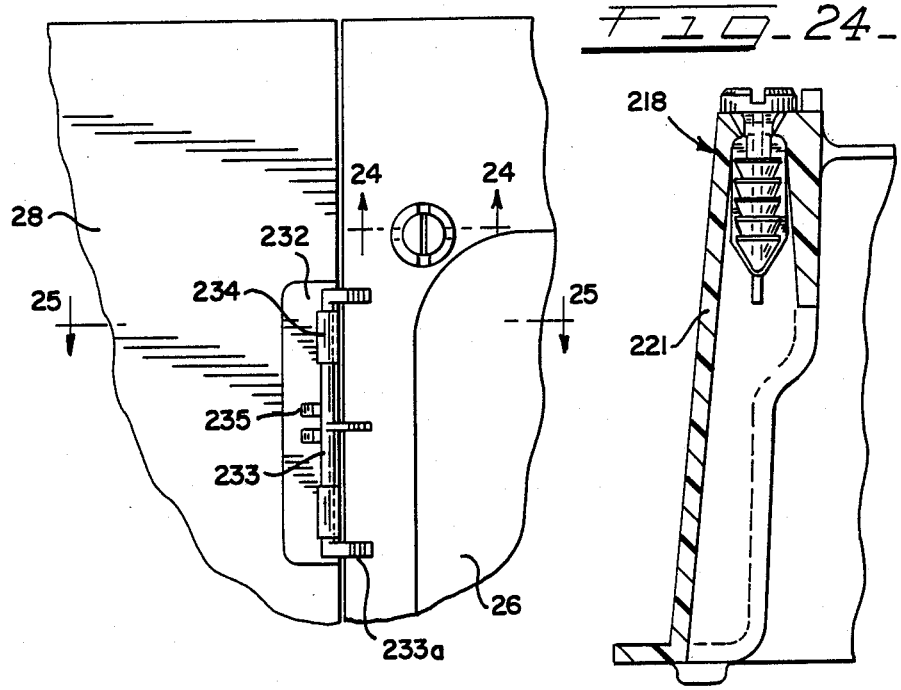
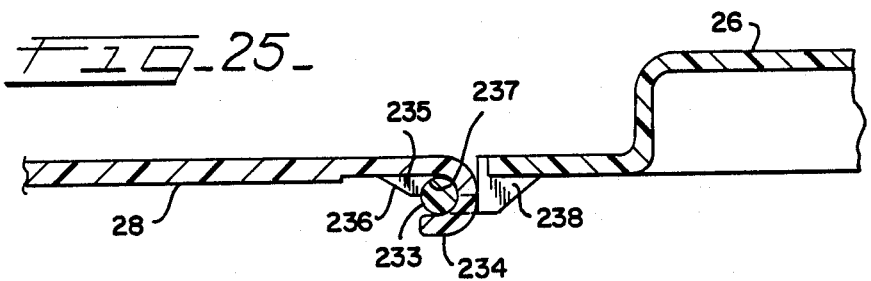
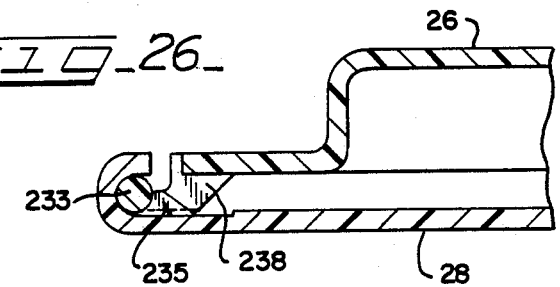

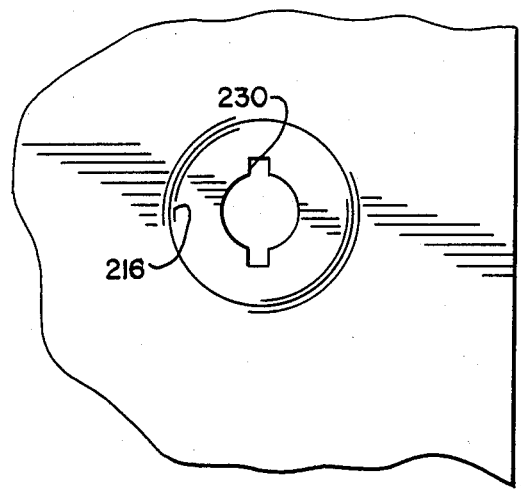
FIG_27_
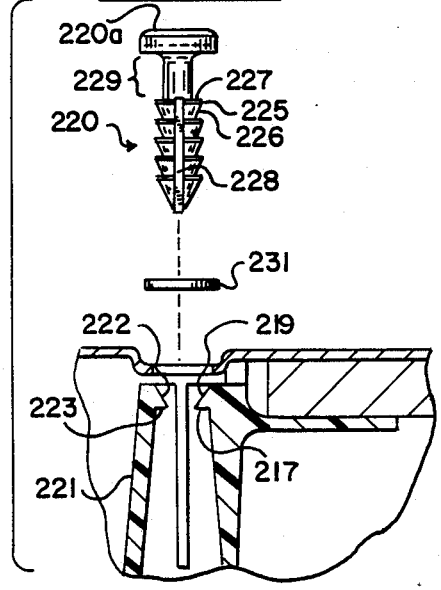
FIG_28_
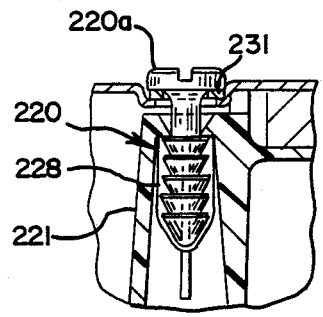
FIG_29_

LATCH ASSEMBLY FOR AN ELECTRICAL LOAD CENTER DOOR, AND METHOD OF ASSEMBLY THEREOF

DESCRIPTION

1. Technical Field

The present invention relates generally to electrical distribution systems and, more particularly, to a compact, non-metallic electrical load center particularly adapted for residential or light industrial use.

2. Background Prior Art

Historically, enclosures for electrical equipment, such as circuit breaker panel boards or load centers, have invariably been formed from metal. These metallic enclosures are usually manufactured in mass-production from metal sheets in a succession of operations, including cutting, blanking, forming and welding, to create a box-like housing, which usually is then painted. The enclosure covers are produced in a similar fashion in a succession of operations, and a number of components, including component-mounting and supporting elements, must then be assembled into the box-like housing. Since the metallic enclosure is electrically conductive, insulators must be used for mounting the various bus bars within the enclosure.

In recent years, there has been significant activity in the direction away from the utilization of such metal enclosures for distribution load centers. For example, U.S. Pat. No. 3,801,875 discloses a non-metallic load center molded plastic enclosure consisting of a housing that has integrally-formed back and side walls and a separate cover. The construction of the load center disclosed therein is such that the bus bars are mounted on molded posts that are formed integrally with the back wall of the housing. However, such an arrangement still requires a number of assembly steps and also requires a very specific construction for the bus bars to provide the necessary contact.

More recently, U.S. Pat. No. 4,698,727 proposes a compact, non-metallic load center enclosure or molded plastic load center that includes a plastic casing that has a plastic cover attached thereto to which a plastic door is mounted through a hinge assembly. The case receives a circuit breaker support assembly that consists of a non-metallic support member and specially-configured bus bars that must be manufactured from a number of pieces and requires a number of welding steps.

Other examples of extruded plastic components for load centers are shown in U.S. Pat. Nos. 4,536,823 and 4,118,754.

SUMMARY OF THE INVENTION

According to the present invention, an electrical distribution load center has been developed which eliminates the succession of operations for mass production of metal enclosures and also can be field- or factory-assembled without the use of any special tools. The load center, which is primarily designed for residential and light industrial use, consists of a molded plastic enclosure, an interior circuit breaker bus bar support panel, a trim panel and a door hinged to the trim panel, all of which are preferably formed by injection-molding.

The enclosure and the circuit breaker panel have cooperating interlocking elements so that the two components can be assembled merely by manipulation of the respective components. The interlocking means is designed such that the enclosure and the circuit breaker panel, both of which are generally rectangular, can be assembled in either of two 180° orientations.

Furthermore, the enclosure has integral endwalls that provide for connection of electrical wires or conductors and are mirror images of each other so that the enclosure can be utilized for introducing the main cable into either end of the load center and accommodating exiting wires on either end thereof. In addition, the enclosure is designed such that a space accommodating external wires is provided between the exterior wall stud and the enclosure to eliminate the need for any drilling of the stud should there be a need for stringing wires externally of the load center from the top to the bottom of the load center. The enclosures are also configured so that they can be nested for shipment and storage. The nested enclosures also reduce the potential of breakage.

In the preferred embodiment, the circuit breaker bus bar support panel is designed such that the bus bars can be assembled thereto by heat staking. Other means of assembly include: (1) insert molding; (2) snap-fitting the bars onto the panel; (3) threaded fasteners; (4) solvent bonding; and (5) ultrasonic bonding. Furthermore, the bus bars are constructed of a generally U-shaped configuration so that the respective legs extend parallel to each other for ease in attachment of circuit breakers thereto. The circuit breaker bus bar support panel also incorporates latching fingers, which are beveled, for snap-in connection of the circuit breakers to the panel.

The trim panel and door are designed such that integral hinge portions are formed on the respective panels which can be interlocked merely by manipulation of the parts. In addition, the door incorporates a latch mechanism which can again be assembled without the use of any special or extraneous tools.

More specifically, in its broadest aspect, the invention is an electrical distribution load center enclosure consisting of non-conductive plastic forming a back wall with side walls and endwalls extending from the back wall. An interior circuit breaker bus bar support panel is releasably retained on the enclosure and supports a pair of generally U-shaped bus bars. The support panel has rows of apertures in communication with the bus bars for reception of circuit breaker contact jaw shrouds. A non-conductive plastic trim panel extends across the support panel and is releasably secured to the enclosure with quick-latching fasteners and a molded plastic door is operatively hinged to the trim panel. The molded plastic door has a latch mechanism supported thereon which cooperates with the trim panel to latch the door to the trim.

BRIEF DESCRIPTION OF DRAWINGS

FIG. 1 shows an exploded perspective view of the components forming a 200-amp, 40-circuit load center;

FIG. 2 is a view showing the door in an open position for exposing the circuit breakers mounted therein;

FIG. 3 is a fragmentary partial top view of the enclosure showing particularly the electrical conductors leading to the inside of the load center;

FIG. 4 is a fragmentary cross-section view as viewed along line 4—4 of FIG. 3 showing the cross-section configuration of the side wall of the load center enclosure or housing;

FIG. 5 is a plan view of the enclosure;

FIG. 6 is an end view of the enclosure;

FIG. 7 is an enlarged exploded view of one embodiment showing the connection means for the electrical conductors leading from the load center;

FIG. 7a is a plan view of a filler plug as utilized by the load center embodiment of FIG. 7;

FIG. 7b is an isometric view of the filler plug of FIG. 7a;

FIG. 7c is a top view of the load center trim panel taken along line 7c—7c of FIG. 1;

FIG. 8 is a view similar to FIG. 7 showing a modified form of electrical conductor connecting means;

FIG. 9 is a perspective view showing stackability of the load center enclosure of shipment and storage;

FIG. 10 is a plan view of the enclosure with the circuit breaker panel mounted therein for a 200-amp, 40-circuit load center;

FIG. 11 is a perspective front view of the circuit breaker bus bar support panel;

FIG. 12 is a perspective rear view of the circuit breaker bus bar support panel showing the bus bars in assembled condition therein;

FIG. 13 is a perspective front view of a 100-amp, 20-circuit breaker bus bar support panel;

FIG. 14 is a perspective rear view of the panel of FIG. 13 showing a snap-in mounting for the bus bar;

FIG. 15 is a cross-sectional view as viewed along line 15—15 of FIG. 10;

FIG. 16 is a cross-sectional view as viewed along line 16—16 of FIG. 10;

FIG. 17 is an enlarged plan view with parts broken away showing the latch between the circuit breaker panel and the enclosure;

FIG. 18 is a cross-sectional view as viewed along line 18—18 of FIG. 10;

FIG. 19 is a bottom plan view of the door latch mechanism;

FIG. 20 is a view of the latch, similar to FIG. 19, with the latch pushed to the release position;

FIG. 21 is a cross-sectional view as viewed along line 21—21 of FIG. 19;

FIG. 22 is a cross-sectional view as viewed along line 22—22 of FIG. 19, showing the manner of assembly;

FIG. 23 is an enlarged plan view of the hinge between the door and the trim panel;

FIG. 24 is a cross-sectional view as viewed along line 24—24 of FIG. 23;

FIG. 25 is a cross-sectional view as viewed along line 25—25 of FIG. 23;

FIG. 26 is a cross-sectional view showing the door in a closed position;

FIG. 27 is an enlarged fragmentary plan view of the trim panel showing the mounting opening;

FIG. 28 is an exploded view of the fastener, trim panel and enclosure connection; and, FIG. 29 is a cross-sectional view of the installed fastener.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

This invention is related to commonly assigned Square D Company patent applications, Ser. Nos. 382830, 384602 and 384606.

FIG. 1 of the drawings shows a load center, generally designated by reference numeral 20, consisting of an enclosure or housing 22, a molded internal circuit breaker bus bar support panel 24 with bus bars (not here shown), a cover trim piece 26 and a door 28 hinged to the trim piece 26.

The enclosure 22 is preferably injection-molded from a special plastic and is constructed such that they can be nested into each other for shipment and storage. For example, the plastic material may be a Noryl ® plastic, a registered trademark of General Electric Company. Thus, the enclosure 22 (FIG. 5) has a back wall 30, a pair of opposite side walls 32 and a pair of opposite endwalls 34. The respective corners between the side walls and the endwalls have a molded corner fillet that defines a semi-pyramidal support surface 35.

According to one aspect of the invention, the enclosure 22 is configured so that the sidewalls 32 taper outwardly so that it can easily be mounted on studs and accommodate wiring, as will be explained later. The side walls 32 (FIG. 4) have a first planar portion 32a extending from an upper free edge 38 thereof, an offset portion 32b intermediate the opposite edges, and a second inwardly-spaced, generally-flat planar portion 32c terminating in the bottom wall 30. Each of said first and second planar portions 32a, 32c have respective inner and outer surfaces. The outer surface of said second planar portion 32c is spaced inward of said inner surface of said first planar portion 32a to permit the stacking of the enclosures 22.

Each upper flat wall portion 32a has a pair of mounting flanges 40 extending outwardly and spaced from the free edge 38 of each side wall. The spacing between the surface 40a of the mounting flange 40 and the edge 38 is dimensioned to receive dry wall construction 42 of conventional thickness and the spacing can vary dependent upon the thickness of the dry wall. The flange may be secured to the stud S by means of conventional fasteners such as fasteners 44 that have heads.

The spacing between the side wall portions 32a of the respective side walls is such that these side wall portions are in close proximity to the surface of the wall stud S. However, the offset portion 32b defines an elongated narrow space 50 between stud S and planar portion 32c that extends the length of the enclosure to provide a space for stringing conductors 52 between the top and bottom of the enclosure. Thus, in instances where conductors approach the top or bottom of the enclosure 22 and it is desirable to enter the opposite endwall of the enclosure 22, the space or wire channel 50 can be utilized for this purpose without a necessity of drilling any holes in the wall studs above or below the enclosure 22.

With the construction so far described, the offset portions 32b of the side walls 32 will allow the respective enclosures to be nested within each other and reduce the amount of space required during shipment and storage prior to distribution and installation. This feature is disclosed in FIG. 9, wherein a plurality of such enclosures 22 are stacked upon each other into a carton or onto a pallet for shipment.

Referring again to FIG. 5, the enclosure 22 is also designed to be surface-mounted on a wall and, for this purpose, the back wall 30 has a plurality of mounting holes 53 for surface mounting of the enclosure. The back wall 30 also has first and second rows of mounting hooks 54 for mounting the circuit breaker bus bar support panel 24 into the enclosure, as will be described later. In addition, the center portion of the back wall 30 has a pair of latching posts 56 and guide bars 58, for a purpose that will be described later.

Traditional sheet metal electrical enclosures typically have used separate metal cable clamps to secure electrical conductors to the enclosure. These clamps require a smooth bushing surface to protect insulation on the conductors, a place for clamping the conductors, and a threaded portion for securing the clamp to the enclosure. These clamps are typically not provided by the manufacturer of the enclosure and also require wire clamping screws located on the exterior of the enclosure.

According to one aspect of the invention as illustrated in FIG. 7, clamps 60 are formed as part of the enclosure 22 to eliminate a need for traditional clamps to secure the conductors. The enclosure 22 has integrally formed cable-mounting means so that a main cable entrance is provided via either the top or the bottom endwalls 34, and outlet wires can also exit via either the top or the bottom endwalls 34. Thus, the respective endwalls 34 are constructed to be mirror images of each other.

The clamp 60 is used for round conductors, such as those rated for 40 amps, and above, as well as for multiple conductors rated 40 amps, and below. The clamp 60 includes a base portion 61 and a plurality of clamp pieces 64. The base portion 61 of the clamp 60 is molded in the enclosure 22, forming a smooth bushing surface 62 for the round conductors. A wire clamp piece 64 is formed separately from either plastic or metal and is attached to the enclosure 22 with screws 64a via screw holes 65. These screws are located on the inside of the enclosure 22, providing a convenient means for attaching the clamp piece 64.

A removable "knock-out" 66 (FIG. 6) is provided in the endwall 34 adjacent to each clamp piece 64, providing access for round wiring. The clamp pieces 64 are provided in two sizes; one is suitable for #14-#3 wires and the other for #8-#1 wires. Each of the clamp pieces 64 is capable of securing multiple wiring circuits.

In a preferred embodiment, the endwall 34 also has a knock-out opening 70 (FIG. 6) providing for a main cable entrance. The knock-out opening 70 has a smaller segment 72 and a large segment 74, for receiving main cables of different sizes.

Referring again to FIG. 7, an alternate main cable entrance is disclosed. Accordingly, the alternate embodiment includes a main cable-mounting block 76 located in one corner of the enclosure 22 and having a generally arcuate upwardly-opening slot 78 defined therein. The slot 78 communicates with the opening 70 in the endwall 34, and a cable clamp 80 is positioned over the cable and received onto studs 82 (FIG. 5) molded onto the back wall 30. After the main cable has been installed in its proper position, the cable clamp 80 may be secured to the back wall 30 by screws or other suitable fastening devices (not shown) received into the studs 82 to securely clamp the cable between the cable-mounting block 76 and the cable clamp 80.

Each endwall 34 also has a conductor-mounting member 84. The mounting member 84 is provided to secure NM-B flexible cable conductors, such as RO-MEX® conductor cables distributed by the Rome Cable Co., for lower amperage circuits, such as 30 amps or less. The conductor mounting member 84 has an outer wall portion 84a and an inner wall portion 84b. The mounting 84 includes a plurality of slots 86 extending from upper edges thereof. The slots 86 are v-shaped in plan view, as shown in FIG. 5, to provide an interference fit with the NM-B conductor placed therein. The slots 86 form an angle of 120°. Angles substantially less than 120° were found to cut the NM-B cable insulation while angles substantially greater than 120° were found to permit the NM-B cable to slip. The slots 86 on the inner wall portion 84b are directed toward the nearest sidewall 32 so that conductors are automatically directed toward the appropriate side of the enclosure 22. The outer wall portion 84a includes knock-out members 88 closing the outer edge thereof.

The outer wall portion 84a extends upwardly further than the inner wall portion 84b to form a plurality of wire bending fixtures 87. The conductor is bent appropriately about one of the wire bending fixtures 87, then pressed into the appropriate one of the slots 86.

Each of the slots 86 are sized to receive two NM-B conductor cables. When the two NM-B conductors are inserted, one on top of the other, the top one extends upwardly to the top of the inner wall portion 84b. Should only one NM-B conductor be required in the slot 86, a V-shaped filler plug 89a, illustrated in FIGS. 7A and 7B, is inserted in the base of the particular slot 86 to fill the space otherwise occupied by the other NM-B conductor. If a knock-out member 88 is removed, or no NM-B conductors are placed in the corresponding slot 86, two filler plugs 89a are utilized.

The filler plug 89a defines an angle of 130° to provide an interference fit when placed in the slot 86.

The mounting member 84 eliminates a need for separately purchased wire clamps, or having to feed and pull conductors through knock-out openings as in typical panel board endwalls. Further, the mounting member 84 permits the conductors to be stripped of their insulation prior to insertion into the slots 86, which is much easier than stripping insulation from a conductor already clamped to the enclosure.

As illustrated in FIG. 7c, the trim panel 26 includes extensions 89b which are complementarily received by the portion of the slots 86 of the outer wall portion 84a extending beyond the inner wall portion 84b. The extensions 89b further secure the NM-B conductors in the slots 86, and fill up the openings in the slots 86 above the conductors.

A slightly modified form of conductor-support means is shown in FIG. 8. This form of the conductor-mounting means consists of a generally rectangular mounting block 90 having a plurality of circular openings 91. The openings 91 have slots 92 extending to one surface of the block 90. A plug 93 is received into each of the slots to secure the conductors within the opening 91. The endwall 34 also has conductor support members 61 formed thereon similar to those shown in FIG. 7.

According to one of the primary aspects of the present invention, the circuit breaker bus bar support panel 24 is molded from a plastic material and is configured such that bus bars 114 can be mounted thereon by heat staking, snap-fitting or ultrasonic bonding without the use of any fasteners, and the panel 24 can be mounted on the enclosure 22 without the use of fasteners.

According to another of the primary aspects of the present invention, the circuit breaker bus bar support panel 24 is molded from a plastic material and is configured such that the bus bars 114 can be mounted thereon through the process of heat-staking. Thus, as shown in FIGS. 11 and 12, the bus bar support panel 24 has side walls 102 and 104 and endwalls 106 and 108. A top surface 110 (FIG. 11) of the bus bar support panel 24 has a plurality of pairs of spaced openings 112 that are configured to receive jaw shrouds of circuit breakers, as will be described later.

An underside 111 of the bus bar support panel 24 has integral molded bus bar mounts (FIG. 12) which are heat staked over to contain the bus bars 114 when installed. The two bus bars 114 (FIG. 12) are identical in configuration, and each has a base 116 with a pair of parallel legs 118 extending from opposite ends of the base 116.

In the preferred embodiment, the load center 20 provides a dual voltage output, as for example 120/240 volts. Accordingly, the load center 20 has a pair of bus bars 114, one of which is at a 120 V potential with respect to neutral and the other of which is also at a 120 V potential with respect to neutral, though 180° out of phase from the first bus bar 114, thereby providing a 240 V potential between the bus bars 114.

The bus bar mount include sets of walls 119 extending from the underside 111 of the bus bar support panel 24. Also, the bus bar mount includes a first and second walls 120a, b, each extending from and integral with the underside 111 of the top surface 110 and spaced from a respective one of the endwalls 106, 108. A plurality of pairs of tapered guide walls 124 are also formed integral with the top wall 110 and are positioned to define elongated, aligned slots 126.

The bus bar mount also includes positioning endwalls 128 to further position ends of each of the legs 118 of the bus bars 114. Thus, the bus bars are heat-staked onto the support panel 24 without the use of any additional type of fastener. In mounting the bus bars 114 onto the support panel 24, the ends of the respective legs 118 are positioned against the positioning endwalls 128 and bus bar base 116 against endwall 108. Each leg 118 of the bus bars 114 is located between the aligned rows of pairs of openings 112 to have the opposite surfaces of the bus bars 114 exposed for engagement with circuit breaker contact jaw, to be explained later. After being positioned as shown, the upper edges of the tapered guide walls 124 and first and second walls 120a, b and are heat staked over the bus bars 114, as shown at 129 in FIG. 12.

Additional assembly means of attaching the bus bars 114 onto the support panel 24 are ultrasonic bonding, solvent bonding, insert molding, snap-fitting, and by means of conventional threaded fasteners.

FIGS. 13 and 14 show an alternate embodiment of the invention. For clarity, common reference numbers will be used. A 100-amp, 20-circuit bus bar support panel 24 has the bus bars 114 snap-fitted onto the support panel 24. The support panel 24 consists of a molded plastic member 132 that has side walls 102, 104 and endwalls 106, 108. A top surface 110 of the member 132 has a plurality of pairs of the spaced openings 112 are configured to receive jaw shrouds of the circuit breakers, as will be described later.

The underside 111 of the support panel 24 is illustrated in FIG. 14, and has an integrally-molded bus bar mount. As with the support panel 24 of FIG. 12, in this specific embodiment, the two bus bars 114 are identical in configuration and each has a base 116 with a pair of parallel legs 118 extending from opposite ends of the base 116.

The bus bar mount includes a snap-in wall 150 extending from and integral with the underside 111 of the support panel 24 and spaced from each of the endwalls 106, 108.

As illustrated in greater detail in FIG. 16, the free edge of the snap-in wall 150 has a lip 152 formed thereon. Referring again to FIG. 14, a plurality of pairs of guide walls 119 are also formed integral with the underside 111 and are positioned to define aligned, elongated slots 126. Two such pairs of guide walls 119 are shown for each of the legs 118 of each of the bus bars 114. The specific number of guide walls 119 can vary depending upon the application, without departing from the scope of the invention.

The bus bar mount includes positioning endwalls 156, as illustrated in greater detail in FIG. 16b. The positioning endwalls 156 are integral with and positioned to engage ends of each of the legs 118 of the bus bars 114. The positioning endwalls 156 have slots 158 extending from one surface thereof for receiving the ends of the legs 118. Thus, the bus bars 114 can easily be mounted onto the bus bar support panel 24 without the use of any type of fastener. In mounting the bus bars 114 onto the support panel 24, the ends of the respective legs 118 (FIG. 14) are positioned into the slots 158 on the positioning endwalls 156 and the base 116 of the bus bar 114 is then forced between the respective endwall 136 and its adjacent snap in wall 150. The snap-in lips 152 (FIG. 16) of the snap-in walls 150 define free ends thereof to lock the bus bars 114 onto the circuit breaker bus bar support panel 24. Each of the legs 118 of a bus bars 114 is located between the aligned rows of pairs of the spaced openings 112 to have the opposing surfaces of the bus bars 114 exposed for engagement with circuit breaker contact jaws, to be explained later.

According to one further aspect of the invention, the panel 24 also incorporates grips for holding the circuit breakers 172 on the panel 24, as shown in FIG. 18. One such grip includes mounting fingers 170 which are molded and extend from the underside 111 of the panel 24. The fingers 170 have one surface generally aligned with an edge of the spaced openings 112. The fingers 170 have projections 171 formed on the ends thereof.

A 120 v circuit breaker 172 is designed to couple to just one of the bus bars 114. Accordingly, it has for jaw shrouds 173 extending from its bottom wall 172a and extending through the spaced openings 112. The four jaw shrouds 173 have recesses 174 that cooperatively engage the projections 171. A pair of contact elements 175 are positioned between one set of the jaw shrouds 173 to contact the respective bus bar 114.

A 240 v circuit breaker is designed to couple with both of the bus bars 114. According to one embodiment, the 240 v circuit breaker has two pairs of contact elements 175, one from each pair of the jaw shrouds 173. According to another embodiment, the 240 v circuit breaker is effectively two 120 v circuit breakers attached side by side, each having a single pair of the contact elements 175. One of the contact elements 175 couples to one of the bus bars 114, and the other of the contact elements 175 couples to the other of the bus bars 114.

The projections 171 have two beveled surfaces 171a and 171b that define different camming angles for the jaw shrouds 173. Thus, the upper surface 171a defines an angle of about 30° with respect to a vertical reference plane, while the lower surface defines an angle of about 60°. This arrangement will require greater forces for removing the circuit breaker 172 than for inserting the circuit breaker 172.

An integral panel snap finger 176 extends upwardly from the top surface 110 to the panel 24 to further hold the circuit breaker 172 on the panel 24. The panel snap finger 176 cooperatively engages a projection 177 integral with the circuit breaker 172 to retain the circuit breaker 172 on the panel 24. To remove the circuit breaker 172, a screw driver SD inserted between the circuit breaker 172 and the panel snap finger 176, and twisted, outwardly bending the panel snap finger 176, as illustrated in phantom. Use of the panel snap finger 176 is particularly beneficial for use on circuit breakers used to terminate ungrounded service conductors, as for example, a main breaker on a residential panel, because U.L. standards require that such ungrounded service conductors include an additional fastener that requires other than a pull to release the circuit breaker from its mounting position on the panel.

The circuit breaker bus bar panel 24 includes neutral bars forming a part thereof as illustrated in FIGS. 13 and 14, a first neutral bar 180 extends along one side wall 104 and is supported on a generally flat surface defined by a ledge 181. One end of the first neutral bar 180 is placed over a post extending from the ledge 181. The first neutral bar 180 is held in place by heat-staking over posts in the neutral bar 180.

The opposite side 102 of the panel 24 has a second neutral bar 184 supported in a similar manner on a ledge 181. The first and second neutral bars 180 and 184 are interconnected by an end neutral bar 188 that extends along the endwall 108 and has opposite ends secured to the respective neutral bars through screws 189. A neutral terminal lug 190 is secured to the end neutral bar 188 in a manner well-known in the art. Thus, the single neutral terminal lug 190 is connected to both of the neutral bars 180, 184 through the end neutral bar 188.

According to a further aspect of the invention, the bus bar support panel 24 is mounted and locked onto the enclosure 22 with only a single screw, as illustrated in FIGS. 5 and 15. The mounting would function without the screw, but it is provided for additional security of attachment.

As illustrated in FIG. 15, the top surface 110 of the circuit breaker bus bar support panel 24 has a hollow mounting compartment 192 formed integral therewith which has a slot 193 in one side wall thereof. The slot 193 receives a hook 54 extending from the back wall 30 of enclosure 22. The back wall 30 has a plurality of pairs of the hooks 54, with each of the pairs opening away from each other. Thus, the bus bar support panel 24 can be mounted in either direction in the enclosure 22.

As identified previously, the backwall 30 also includes guide bars 58 defining guide slots 58a. The guide slots 58a cooperate with ridges 58b (FIG. 12) of the bus bar support panel 24 to provide proper lateral orientation of the bus bar support panel 24 relative to the backwall 30.

In order to lock the support panel 24 in place on the enclosure, 22, a resilient spring finger 194 (FIGS. 5 and 17) is formed integral with the circuit breaker bus bar panel 24. The spring finger 194 includes a projection from the underside of the support panel 24 below an opening 195. The spring finger 194 has a shoulder 196 defined adjacent to a free end thereof with a camming surface 197. The camming surface 197 rides on a corresponding camming surface 198, defined on latching post 56, during assembly of the circuit bus bar support panel 24 into the enclosure 24 and snaps into the locked position, as shown in FIG. 17. The spring finger 194 can easily be unlatched by inserting a tool through an opening 195 (FIGS. 10, 11) to force the shoulder 196 out of engagement with the latching post 56.

To further lock the support panel 24 in place on the enclosure 22, a screw 199a (FIG. 1) is disposed through an opening 199 and threaded into a screw hole 200 in the back wall 30 of the enclosure 22.

According to a further aspect of the present invention, the trim piece 26 and the door 28 are molded from a non-conductive plastic and are constructed such that they can be interconnected without use of tools. The trim piece 26, shown in FIG. 2, consists of a main molded panel 210 that has a recessed central rectangular portion 212. The panel 210 also has a hook portion 214 that is forwardly-offset from the front surface of the panel 210 for receiving a latch, to be described later.

The trim panel 26 has openings 216 at respective corners thereof for securing the trim panel 26 to the enclosure 22. For this purpose, the enclosure 22 has receptacles 218 (FIGS. 1 and 10) that have openings for receiving fasteners 220 (FIG. 28) that extend through the openings 216 in the trim panel 26, and a special fastener is utilized for securing the trim panel 26 to the enclosure 22. The fastener 220 is used to secure the trim panel 26 to the enclosure 22.

As illustrated in FIGS. 24 and 28, the receptacle 218 has a flexible member 221 with a camming surface 222 and a shoulder 223. Aligned with shoulder 223 is a second shoulder 217 on side wall 32 with a camming surface 219 extending therefrom. The fastener 220 has projections 225 spaced ⅛ inch apart, allowing for adjustment for varying thickness of wall coverings. The projections 225 have camming surfaces 226 and shoulders 227 for securing to the receptacle 218. The fastener 220 also has two ribs 228 spaced 180° apart and wider than the projections 225. The ribs 228 deflect the flexible member 221 of the receptacle 218 when the fastener 220 is rotated 90°, thus releasing the fastener 220 from the receptacle 218. A head 220a of the fastener 220 has a slot for accommodating a screwdriver, coin or other object for rotating the fastener 220.

Referring to FIG. 27, the trim panel 26 has a circular hole 216 with rectangular slots 230. The circular hole 216 has a diameter sufficient for the fastener projections 225 to pass freely. The rectangular slots 230 allow the two fastener ribs 228 to pass freely and also align the fastener 220 in a latched position with respect to the receptacle 218. The fastener 220 also has an undercut 229 between the ribs 228 and the head (see FIG. 28) allowing for the material thickness of the trim panel 26 and an optional washer 231, to be described below.

The trim panel 26 is removed from the enclosure 22 by rotating all four of the fasteners 220 90° and then pulling outwardly on the trim panel 26. The fasteners 220 are released from the receptacle 218, and stay captive to the trim since the ribs 228 on the fastener 220 are now oriented behind the circular part of the opening 216 in the trim 26. This reduces the potential for the fasteners 220 becoming lost. Referring to FIG. 28, a 1/16 inch thickness plastic washer 231 is supplied with each of the fasteners 220 and is placed between the head of the fastener 220 and the trim when the wall covering thickness is such that the fastener 220 itself (with ⅛ inch adjustment between projections) does not provide for a sufficiently tight fit between the trim panel 26 and the wall covering.

According to a further aspect of the invention, the door panel 28 (FIG. 23), which is also molded from a plastic material, has one portion of a hinge 232 and the trim panel 26 has a corresponding portion of the hinge 232 formed integral therewith.

The hinge 232 of the trim panel 26 (FIG. 23) has a hinge pin 233 extending between a pair of support walls 233a to provide a space between the hinge pin 233 and the edge of the trim panel 26. The door panel 28 has a pair of hinge barrels 234 formed integral with one edge thereof which are spaced from each other and are generally C-shaped in cross-section. A pair of shoulders 235 are formed integral with the inner surface of the door panel 28.

Referring to FIG. 25, each of the shoulders 235 has a camming surface 236 and an opposed arcuate surface 237. The hinge pin 233 has a support wall 238 positioned to be received between the shoulders 235.

To assemble the door panel 28 and the trim panel 26, the C-shaped barrels 234 are positioned over the hinge 233, and a force is applied to the panel 26. This will cause the hinge pin 233 to slide along the camming surface 236 and snap into position between the arcuate surface 237 and the hinge barrel 234. The force that is applied flexes the hinge barrels 234, allowing the hinged barrels 234 to snap onto the hinge pin 233.

According to still a further aspect of the invention, the integrally-molded door panel 28 has a latch mechanism 240 formed separately and is designed such that it can be mounted onto the door panel 28 by manipulation only.

For this purpose, the door panel 28 (FIGS. 19, 21) has an opening 244 with a pair of L-shaped support flanges 246 extending from opposite edges of the opening 244 to define a slot 248 along the inner surface of the door panel 28.

The latch mechanism 240 includes a main body 250 that has a pair of flexible arms 252 extending from one end thereof which have inwardly-directed fingers 254. The main body 250 has a L-shaped latch element 256 formed on the inner surface, bottom thereof and a flange 257 on the top that defines a recess 258.

The door panel 28 has a spring cam 262 formed integral therewith that defines a pair of outwardly-opening channels 264. These channels 264 are designed to receive the spring fingers 254, as shown in FIG. 19.

In assembling the latch 240 onto the door 28, the arms 252 are initially inserted through the opening 244, and the latch 240 is moved to the position illustrated in FIG. 22. Once the main body 250 is in this position, the edge of the main body 250 is in a position to clear the edge of the opening 244 and the latch 240 is pivoted to move the spring fingers 254 into contact with the spring cam 262, as shown in FIG. 19. During this pivotal movement, the main body 250 passes through the opening 244 so that the main body 250 comes into sliding contact with the support flanges 246. The latch 240 is then moved to the left as in FIG. 19, until the spring fingers 254 drop into the channels 264.

The spring fingers 254 will bias the latch 240 to an intermediate latched position, illustrated in FIGS. 19 and 21, where the latch element 256 is hooked over the latch member 214 on the trim panel 26. In this position, the latch 256 is biased into a position where it will slide under the latch member 214 in the trim panel 26 to secure the door in a closed position. In order to open the door 28, a finger is inserted into the recess 258 and the latch is forced to the left, as viewed in FIG. 21, and as illustrated in FIG. 20, so that the latch element 256 clears the latch member 214 and the door 28 can be opened. When the latch is released, the spring fingers 254 will automatically move the latch back to the intermediate latched position.

The latch has a camming surface on latch element 256 which cooperates with a camming surface on trim offset 214. This causes the latch to move to the left by simply pushing on the front of the door to close it. The latch does not have to be manipulated to close the door.

It should be noted that the door panel 28 has an inwardly-directed peripheral edge 230a (FIGS. 21, 22) that is located outside the edge of the trim panel 26 so that this edge engages the wall board adjacent the trim 26 to provide a small space between the trim panel 26 and the door panel 28.

While specific embodiments have been illustrated and described, numerous modifications come to mind without significantly departing from the spirit of the invention and the scope of protection is only limited by the scope of the accompanying claims.

What is claimed is:

1. A latch assembly for a door pivotally joined to one side of an electrical load center enclosure, the enclosure including a flange on an other, opposite side of said enclosure, said door movable between an open and a closed position, the assembly comprising:
   a door panel having an inner surface, an outer surface and an opening, said opening including opposing, inwardly directed flanges;
   a latch mechanism disposed in said door opening, said latch mechanism including a main body having an inner surface, first and second flexible arms extending from one end of said main body, and first and second inwardly directed fingers joined to a respective one of said first and second arms, wherein said latch mechanism is disposed in said opening, said main body inner surface engaging said flanges and slidable between a latched and an unlatched position;
   a spring cam integral with said inner surface of said door panel, said spring cam defining first and second outwardly opening channels and adapted to receive said first and second inwardly directed fingers, said fingers biasing said main body towards said latched position; and
   a generally L-shaped latch element attached to said main body inner surface, said L-shaped latch element defining a latch recess adapted for receiving said flange when said main body is in said latched position.

2. The latch assembly of claim 1 said latch element terminates with a camming surface, said camming surface angled to move said main body toward said unlatched position when said camming surface engages said flange.

3. A latch assembly for a door pivotally joined to one side of an electrical load center enclosure, said door including a door panel having an inner surface, an outer surface and an opening, said opening including opposing, inwardly directed flanges, said enclosure including a flange on an other, opposite side of said enclosure, said door movable between an open and a closed position, the assembly comprising:
   a latch mechanism adapted to be disposed in said door opening, said latch mechanism including a main body having an inner surface, first and second flexible arms extending from one end of said main body, and first and second inwardly directed fingers joined to a respective one of said first and second arms, said main body inner surface engaging said flanges and slidable between a latched and an unlatched position;

a spring cam adapted for attachment with said inner surface of said door panel, said spring cam defining first and second outwardly opening channels an adapted to receive said first and second inwardly directed fingers, said fingers biasing said main body towards said latched position; and a generally L-shaped latch element adapted for attachment to said main body inner surface, said L-shaped latch element defining a latch recess adapted for receiving said flange when said main body is in said latched position.

4. The latch assembly of claim 3 wherein said latch element terminates with a camming surface, said camming surface angled to move said main body toward said unlatched position when said camming surface engages said flange.

5. A method of assembling a latch assembly for a door, said door being pivotally joined to one side of an electrical load center enclosure, said enclosure including a flange on an other, opposite side of said enclosure, said door being movable between an open and a closed position, the method of assembly including the steps of:

providing a door panel having an inner surface, an outer surface and an opening, said opening including opposing, inwardly directed support flanges;

providing a latch mechanism, said latch mechanism including a main body having an inner surface, first and second flexible arms extending from one end of said main body, and first and second inwardly directed fingers joined to a respective one of said first and second arms;

providing a spring cam integral with said inner surface of said door panel, said spring cam defining first and second outwardly opening channels adapted to receive said first and second inwardly directed fingers, said fingers biasing said main body towards said latched position;

providing a generally L-shaped latch element attached to said main body inner surface, said L-shaped latch element defining a latch recess adapted for receiving said flange when said main body is in said latched position;

inserting said latch mechanism into said opening, engaging said main body inner surface with said flanges.

6. The latch assembly of claim 5 wherein said latch element terminates with a camming surface, said camming surface angled to move said main body toward said unlatched position when said camming surface engages said flange.

* * * * *